United States Patent
Etges et al.

(10) Patent No.: US 12,540,666 B2
(45) Date of Patent: Feb. 3, 2026

(54) ELECTRICALLY OPERABLE AXLE DRIVE TRAIN

(71) Applicant: SCHAEFFLER TECHNOLOGIES AG & CO. KG, Herzogenaurach (DE)

(72) Inventors: Dominik Etges, Aachen (DE); Dominik Lischowski, Dortmund (DE); Benno De Brouwer, Wurselen (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 18/838,363

(22) PCT Filed: Jan. 13, 2023

(86) PCT No.: PCT/DE2023/100022
§ 371 (c)(1),
(2) Date: Aug. 14, 2024

(87) PCT Pub. No.: WO2023/155947
PCT Pub. Date: Aug. 24, 2023

(65) Prior Publication Data
US 2025/0155011 A1    May 15, 2025

(30) Foreign Application Priority Data

Feb. 15, 2022    (DE) ............ 10 2022 103 479.8

(51) Int. Cl.
*F16H 57/02*    (2012.01)
*B60K 1/00*    (2006.01)
(Continued)

(52) U.S. Cl.
CPC ....... *F16H 57/027* (2013.01); *F16H 57/0424* (2013.01); *B60K 1/00* (2013.01);
(Continued)

(58) Field of Classification Search
CPC ............ F16H 57/027; F16H 57/0424; F16H 2057/02034; F16H 2057/02052; B60K 1/00; B60K 2001/001
See application file for complete search history.

(56) References Cited

U.S. PATENT DOCUMENTS 2,818,047 A * 12/1957 Powell ................ F01M 13/04
74/606 R
3,951,171 A * 4/1976 Gibel .................. F01N 1/08
138/42
(Continued)

FOREIGN PATENT DOCUMENTS

CN    118622948 A *    9/2024
DE    60024751 T2    7/2006
(Continued)

OTHER PUBLICATIONS

Erik Schneider et al., Hochintegrativ und Flexibel Elektrische Antriebseinheit für E-Fahrzeuge [Highly Integrative and Flexible Electric Drive Unit for E-Vehicles, ATZ, vol. 113, May 2011, pp. 360-365.

*Primary Examiner* — Adam D Rogers
(74) *Attorney, Agent, or Firm* — Volpe Koenig

(57) ABSTRACT

An electrically operable axle drive train for a motor vehicle, comprising an electric machine accommodated in a motor housing, and a transmission assembly accommodated in a transmission housing, wherein the electric machine and the transmission assembly form a structural unit, and a ventilation channel extending through the transmission housing, opposite the direction of gravity, connects the transmission assembly within the transmission housing to the environment, wherein a separator cartridge designed as a separate component from the transmission housing is introduced into the ventilation channel and is configured such that it reduces the flow rate of a hydraulic fluid in the ventilation channel.

18 Claims, 5 Drawing Sheets

(51) Int. Cl.
*F16H 57/027* (2012.01)
*F16H 57/04* (2010.01)

(52) U.S. Cl.
CPC ............... *B60K 2001/001* (2013.01); *F16H 2057/02034* (2013.01); *F16H 2057/02052* (2013.01)

(56) References Cited

U.S. PATENT DOCUMENTS

| | | | |
|---|---|---|---|
| 4,446,755 A | | 5/1984 | Takahashi |
| 5,348,570 A | * | 9/1994 | Ruppert, Jr. .......... F16H 57/027 55/504 |
| 6,253,637 B1 | | 7/2001 | Hauser |
| 11,739,877 B2 | * | 8/2023 | Christoff, III .... F16L 55/02736 138/42 |

FOREIGN PATENT DOCUMENTS

| | | | | |
|---|---|---|---|---|
| DE | 102007043462 B3 | | 2/2009 | |
| DE | 102017129566 A1 | | 6/2013 | |
| DE | 102017122639 A1 | * | 3/2019 | ........... F16H 57/027 |
| DE | 102017129586 A1 | * | 6/2019 | |
| DE | 102019204907 A1 | * | 10/2020 | ............ F16H 57/02 |
| DE | 102019204967 A1 | | 10/2020 | |
| JP | 2005291326 A | * | 10/2005 | ........... F16H 57/027 |
| WO | WO-2011060806 A1 | * | 5/2011 | ........... F16H 57/027 |
| WO | WO-2021213778 A1 | * | 10/2021 | ......... B01D 19/0031 |

* cited by examiner

ELECTRICALLY OPERABLE AXLE DRIVE TRAIN

CROSS-REFERENCE TO RELATED APPLICATIONS

This application is the U.S. National Phase of PCT Appln. No. PCT/DE2023/100022, filed Jan. 13, 2023, which claims the benefit of German Patent Appln. No. 102022103479.8, filed Feb. 15, 2022, the entire disclosures of which are incorporated by reference herein.

TECHNICAL FIELD

The present disclosure relates to an electrically operable axle drive train for a motor vehicle, comprising an electric machine accommodated in a motor housing, and a transmission assembly accommodated in a transmission housing, wherein the electric machine and the transmission assembly form a structural unit, and a ventilation channel extending through the transmission housing, opposite the direction of gravity, connects the transmission assembly within the transmission housing to the environment.

BACKGROUND

Electric motors are increasingly being used in motor vehicles to provide alternatives to internal combustion engines that require fossil fuels. Significant efforts have already been made to improve the suitability of electric drives for everyday use and also to be able to offer users the driving comfort they are accustomed to.

A detailed description of an electric drive can be found in an article in the German automotive magazine ATZ, volume 113, 05/2011, pages 360-365 by Erik Schneider, Frank Fickl, Bernd Cebulski and Jens Liebold with the title: Hochintegrativ und Flexibel Elektrische Antriebseinheit für E-Fahrzeuge [Highly Integrative and Flexible Electric Drive Unit for E-Vehicles]. This article describes a drive unit for an axle of a vehicle, which comprises an electric motor that is arranged so as to be concentric and coaxial with a bevel gear differential, a switchable 2-speed planetary gear set being arranged in the power train between the electric motor and the bevel gear differential and likewise positioned to be coaxial with the electric motor and the bevel gear differential or spur gear differential. The drive unit is very compact and allows for a good compromise between climbing ability, acceleration and energy consumption due to the shiftable 2-speed planetary gear set. Such drive units are also referred to as e-axles or electrically operable drive trains.

In addition to purely electrically operated drive trains, hybrid drive trains are also known. Such drive trains of a hybrid vehicle usually comprise a combination of an internal combustion engine and an electric motor, and enable, for example in urban areas, a purely electric mode of operation while at the same time permitting both sufficient range and availability, in particular when driving cross-country. In addition, it is also possible to drive using the internal combustion engine and the electric motor at the same time in certain operating situations.

In the development of electric machines intended for e-axles or hybrid modules, there is a continuing need to increase their power densities, such that the cooling required for this is becoming increasingly important, especially for the electric machines. Owing to the necessary cooling capacities, hydraulic fluids such as cooling oils have become established in most concepts for the removal of heat from the thermally loaded regions of an electric machine.

The transmissions commonly used in the designated e-axles or hybrid modules are usually lubricated with a transmission oil, which is often also used as cooling oil for the electric machine. In order to reliably deliver the lubricant or cooling oil to the various lubrication or cooling points, it is known to form a hydraulic fluid circuit in the corresponding drive device.

In such drive train configurations, ventilation or pressure equalization of the engine and/or transmission compartment with the environment must usually be provided. The challenge here is to design the ventilation in such a way that, on the one hand, an exchange of air can be ensured to equalize the pressure in the engine and/or transmission compartment with the environment, without the ventilation leading to an undesirable leakage of operating media, e.g. oil from the engine and/or transmission compartment. This also represents a challenge because the high speeds typically encountered in such automotive applications encourage the formation of strong oil foam or oil mist within the engine and/or transmission compartment during operation of such a drive system.

Furthermore, due to temperature changes in the oil in such electric axle transmissions, pressure fluctuations regularly occur, which can be avoided by exchanging air with the environment or compensated for by means of appropriate deaerators. Air and vapors enriched with oil should, if possible, only enter the atmosphere in a filtered form, so appropriate filter systems are generally used for this purpose.

In principle, there are numerous known options for venting transmissions. Examples include DE102007043462B3, U.S. Pat. No. 4,446,755 or DE60024751T2.

WO 2011/060 806 A1 discloses a venting arrangement for an assembly with components running in lubricant. The venting arrangement comprises a housing part, a rotating component which is mounted rotatably about a rotation axis A relative to the housing part by means of a rolling bearing, and a ventilation channel for venting the assembly, wherein an inner mouth of the ventilation channel is arranged axially adjacent to the rolling bearing, and wherein the mouth of the ventilation channel at least partially covers the rolling bearing in axial view.

WO 2021/213 778 A1 discloses a deaerating device for a drive component in a motor vehicle, wherein the deaerating device has an access line and a membrane deaerator with a deaerating membrane and an exhaust air side, wherein the deaerating device is designed for fluid-conducting connection of an interior of a drive component to an environment surrounding the drive component, wherein the deaerating membrane is arranged in a planned flow direction from the drive component into the environment surrounding it downstream of the access line and upstream of the exhaust air side, wherein the access line has an aerosol trap which has a labyrinth for depositing liquid on at least one wall of the labyrinth and this aerosol trap is designed as a separate component opposite the access line and opposite the membrane deaerator.

SUMMARY

It is therefore the object of the present disclosure to provide an electrically operable axle drive train for a motor vehicle which avoids or at least reduces the problems known from the prior art and realizes an electrically operable axle drive train for a motor vehicle which ensures safe ventilation of the axle drive train without any undesirable leakage of oil from the axle drive train. It is a further object of the disclosure that the axle drive train is cost-effective to manufacture and simple to assemble.

This object is achieved by an electrically operable axle drive train for a motor vehicle, comprising an electric machine accommodated in a motor housing, and a transmission assembly accommodated in a transmission housing, wherein the electric machine and the transmission assembly form a structural unit, and a ventilation channel extending through the transmission housing, opposite the direction of gravity, connects the transmission assembly within the transmission housing to the environment, wherein a separator cartridge designed as a component separate from the transmission housing is inserted in the ventilation channel, which separator cartridge is configured such that it reduces the flow rate of a hydraulic fluid in the ventilation channel.

Thus, in the axle drive train according to the disclosure, the penetration of hydraulic fluid into a region of the ventilation channel, for example in front of a filter system, can be prevented or reduced. Depending on the operating point in the transmission assembly, hydraulic fluid, for example a transmission oil, reaches critical regions of the ventilation channel, which can be prevented or at least reduced by the separator cartridge. The separator cartridge can ensure that hydraulic fluid is not accidentally collected in regions of the ventilation channel, which in turn ensures that the oil level in the transmission assembly which is required for operation does not unintentionally drop. This ensures that the transmission assembly is operated with sufficient hydraulic fluid without the oil level unintentionally dropping. Furthermore, the improved retention of hydraulic fluid by the separator cartridge can further reduce the environmental impact of unintentionally leaking hydraulic fluid.

The separator cartridge reduces the flow rate of the hydraulic fluid in the ventilation channel and returns the hydraulic fluid to the interior of the transmission assembly, which can prevent or reduce oil loss in the transmission assembly. At the same time, air can escape to compensate for pressure fluctuations due to temperature changes of the hydraulic fluid in the transmission assembly and to remove the vapors generated during operation.

Firstly, the technical elements of the axle drive train according to the disclosure are explained in more detail and particularly preferred embodiments are shown below.

An electrically operable axle drive train of a motor vehicle may comprise at least one electric machine and at least one transmission assembly, wherein the electric machine and the transmission assembly preferably in each case form a structural unit. The electric axle drive train can also have a first electric machine with a first transmission assembly and a second electric machine with a second transmission assembly, which together form a structural unit.

According to the disclosure, the electric machine has a motor housing and the transmission has a transmission housing, wherein the structural unit can then be brought about by fixing the transmission assembly in relation to the electric machine. This structural unit is sometimes also referred to as an e-axle.

The motor housing encloses the electric machine. A motor housing can also accommodate the control and power electronics of the electric machine. The motor housing can furthermore be part of a cooling system for the electric machine, and can be designed such that cooling fluid can be supplied to the electric machine via the motor housing and/or the heat can be dissipated to the outside via the housing surfaces. In addition, the motor housing protects the electric machine and any electronics that may be present from external influences.

A motor housing can be formed in particular from a metallic material. Advantageously, the motor housing can be formed from a cast metal material, such as gray cast iron or cast steel. In principle, it is also conceivable to form the motor housing entirely or partially from a plastic. A motor housing can be single-shell or multi-shell, i.e. undivided or divided.

The transmission housing is a housing for accommodating a transmission. It has the task of guiding existing shafts via the bearings and giving the wheels (possibly cam disks) the degrees of freedom they require under all loads without impeding their rotational and possible path movement, as well as absorbing bearing forces and supporting torques.

A transmission housing can be single-shell or multi-shell, i.e. undivided or divided. The housing is particularly configured to dampen noise and vibrations and also be able to safely absorb lubricant.

The motor housing of the electric machine and/or the transmission housing of the transmission assembly can also each be accommodated in a drive train housing. The drive train housing is preferably formed from a metallic material, particularly preferably from aluminum, gray cast iron or cast steel, in particular by means of a primary shaping process such as casting or die-casting. In principle, however, it would also be possible to form the drive train housing from a plastic material. The drive train housing may particularly preferably have a cup-like basic shape, such that the electric machine and the transmission can be inserted into the drive train housing via the open end face thereof.

An electric machine serves to convert electrical energy into mechanical energy and/or vice versa, and generally comprises a stationary part referred to as a stator or armature, and a part referred to as a rotor arranged to be movable relative to the stationary part. In the context of the disclosure, the electric machine can be configured as a radial or axial flux machine. To form an axially particularly compact axle drive train, preference should be given to axial flux machines.

The electric machine is intended in particular for use within an electrically operable drive train of a motor vehicle. In particular, the electric machine is dimensioned such that vehicle speeds of more than 50 km/h, preferably more than 80 km/h and in particular more than 100 km/h can be achieved. The electric motor particularly preferably has an output of more than 30 KW, preferably more than 50 KW and in particular more than 70 KW. Furthermore, it is preferred that the electric machine provides speeds greater than 5000 rpm, particularly preferably greater than 10,000 rpm, very particularly preferably greater than 12,500 rpm.

Furthermore, the electric machine preferably also has a cooling system. The cooling system is used to dissipate the heat generated by electrical losses within an electric machine. Such a cooling system can have, among other things, cooling channels within the rotor (rotor cooling channel) and/or stator (stator cooling channel), through which a corresponding cooling medium is guided for the purpose of dissipating the heat. Particularly preferably, the cooling system is coupled to the transmission assembly so that, for example, the oil used to lubricate the transmission assembly is also used to cool the electric machine.

The transmission assembly of the electrically operable axle drive train can, in particular, be coupled to the electric machine, which is designed to generate a drive torque for the motor vehicle. The drive torque is particularly preferably a main drive torque, such that the motor vehicle is driven exclusively by the drive torque.

The transmission assembly is preferably designed as a planetary transmission, very particularly preferably as a switchable, in particular two-speed planetary transmission. Furthermore, the transmission assembly can alternatively or additionally comprise a differential gear mechanism. A differential gear mechanism is a planetary transmission with one drive and two outputs. It usually has the function of driving two vehicle wheels of a motor vehicle in such a way that they can turn at different speeds when cornering, but with the same propulsive force.

For the purposes of this application, motor vehicles are land vehicles that are moved by machine power without being bound to railroad tracks. A motor vehicle can be selected, for example, from the group of passenger cars, trucks, small motorcycles, light motor vehicles, motorcycles, motor buses/coaches or tractors.

According to an advantageous embodiment of the disclosure, the ventilation channel has a first channel section extending in the direction of gravity, from which a second channel section extends in the radial direction and axial direction through the transmission housing to the transmission assembly and the separator cartridge is arranged in the second channel section. The advantage of this design is that it enables particularly good ventilation as well as return of the hydraulic fluid to the transmission assembly.

The first channel section and the second channel section may have different flow cross sections. Preferably, the first channel section and/or the second channel section have a circular flow cross section. Furthermore, it is preferred that the first channel section has a shorter flow path than the second channel section.

According to a further preferred development of the disclosure, the separator cartridge is made of a plastic, in particular by means of an injection molding process, which is favorable in terms of production technology on the one hand, but on the other hand also enables weight advantages through the use of a comparatively light material.

Furthermore, according to a likewise advantageous embodiment of the disclosure, the separator cartridge is fixed form-fittingly and/or frictionally in the ventilation channel, which in particular also allows simple and cost-effective installation of the separator cartridge in the ventilation channel.

According to a further particularly preferred embodiment of the disclosure, the separator cartridge has a cylindrical main body, through the interior of which hydraulic fluid can flow through a first opening of a first end face and through a second opening of a second end face, whereby particularly good ventilation and return of hydraulic fluid can be realized.

According to the disclosure, a plug is arranged on the second end face and extends in the axial direction out of the main body, wherein the plug has an outlet channel which is connected to the interior of the main body through the second opening of the second end face. The advantage of this design is that, on the one hand, an axial stop of the separator cartridge can be formed within the ventilation channel, which promotes safe and flawless assembly when the separator cartridge is inserted into the ventilation channel.

In a likewise preferred embodiment of the disclosure, the plug is arranged eccentrically with respect to the cylindrical main body. This can achieve further improvement in assembly safety by implementing a 'poka-yoke' principle through eccentricity, such that the position of the separator cartridge in the ventilation channel is clearly defined.

It may also be advantageous to further develop the disclosure in such a way that a screen element is arranged in the interior axially offset in front of the second opening so that an axial flow of the hydraulic fluid from the interior to the second opening is prevented. The advantage that can be achieved by this is that the flow rate of the hydraulic fluid can be effectively slowed down within the main body of the separator cartridge.

According to a further preferred embodiment of the subject matter of the disclosure, the first opening of the first end face comprises at least two inlet openings which are arranged in the direction of gravity above a return opening provided in the first end face. This makes it possible to ensure particularly effective entry into and exit out of the separator cartridge of hydraulic fluid.

Finally, the disclosure can also be advantageously designed in such a way that radially projecting ribs are formed on the outer lateral surface of the main body, by means of which ribs the separator cartridge is pressed in the ventilation channel, which has proven to be particularly easy to install and cost-effective.

BRIEF DESCRIPTION OF THE DRAWINGS

The disclosure is explained in more detail below with reference to drawings without limiting the general concept of the disclosure.

In the Drawings.

DETAILED DESCRIPTION

Figure 1:
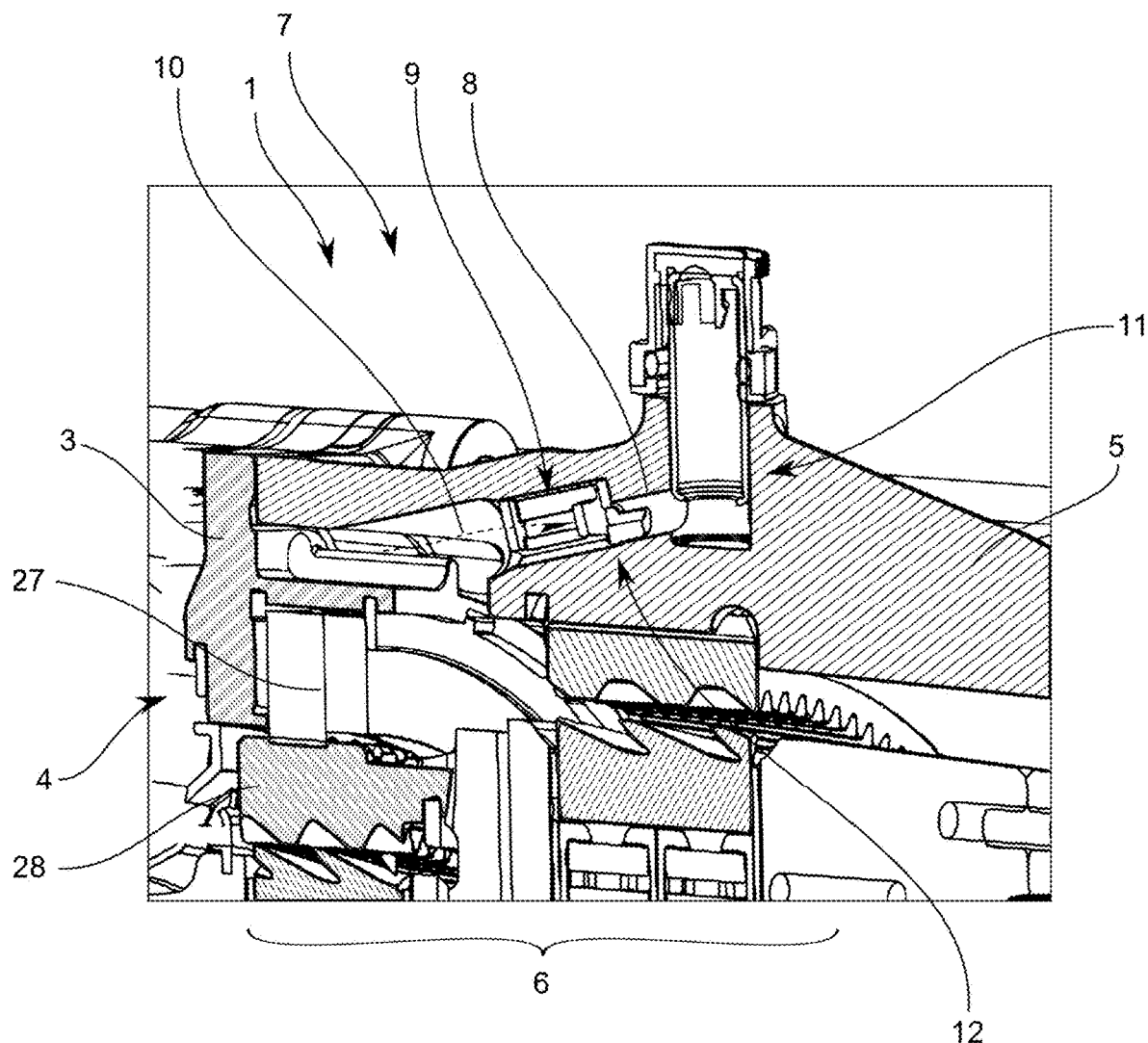
FIG. 1 shows an axle drive train in a perspective axial sectional view.
Figure 5:
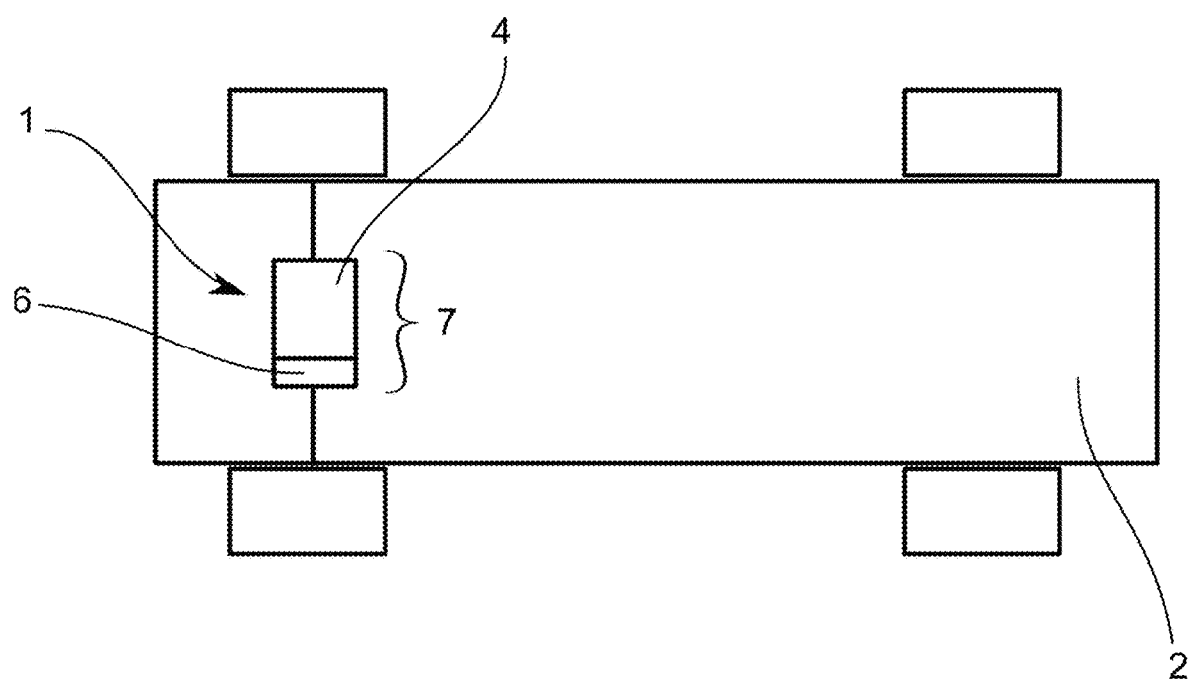
FIG. 5 shows a motor vehicle having an electrically operable axle drive train in a schematic block diagram.

FIG. 1 shows an electrically operable axle drive train 1 for a motor vehicle 2, as is also shown by way of example in FIG. 5.

The axle drive train 1 comprises an electric machine 4 accommodated in a motor housing 3 and a transmission assembly 6 accommodated in a transmission housing 5, wherein the electric machine 4 and the transmission assembly 6 form a structural unit 7.

In the example shown, the transmission assembly 6 is a wet-running planetary transmission configuration which is arranged axially immediately adjacent to the electric machine 4.

A ventilation channel 8 extending through the transmission housing 5, opposite the direction of gravity, connects the transmission assembly 6 within the transmission housing 5 to the environment. A separator cartridge 9 designed as a separate component from the transmission housing 5 is inserted in the ventilation channel 8 and is configured to reduce the flow rate of a hydraulic fluid 10 in the ventilation channel 8.

It can also be seen from FIG. 1 that the ventilation channel 8 has a first channel section 11 extending in the direction of gravity and from which a second channel section 12 extends in the radial direction and axial direction through the transmission housing 5 to the transmission assembly 6 and the separator cartridge 9 is arranged in the second channel section 12.

The ventilation channel 8 opens in the direction of the transmission assembly 6 radially above a freewheel device 27, which coaxially encloses a first ring gear 28 of the transmission device 6.

Figure 2:
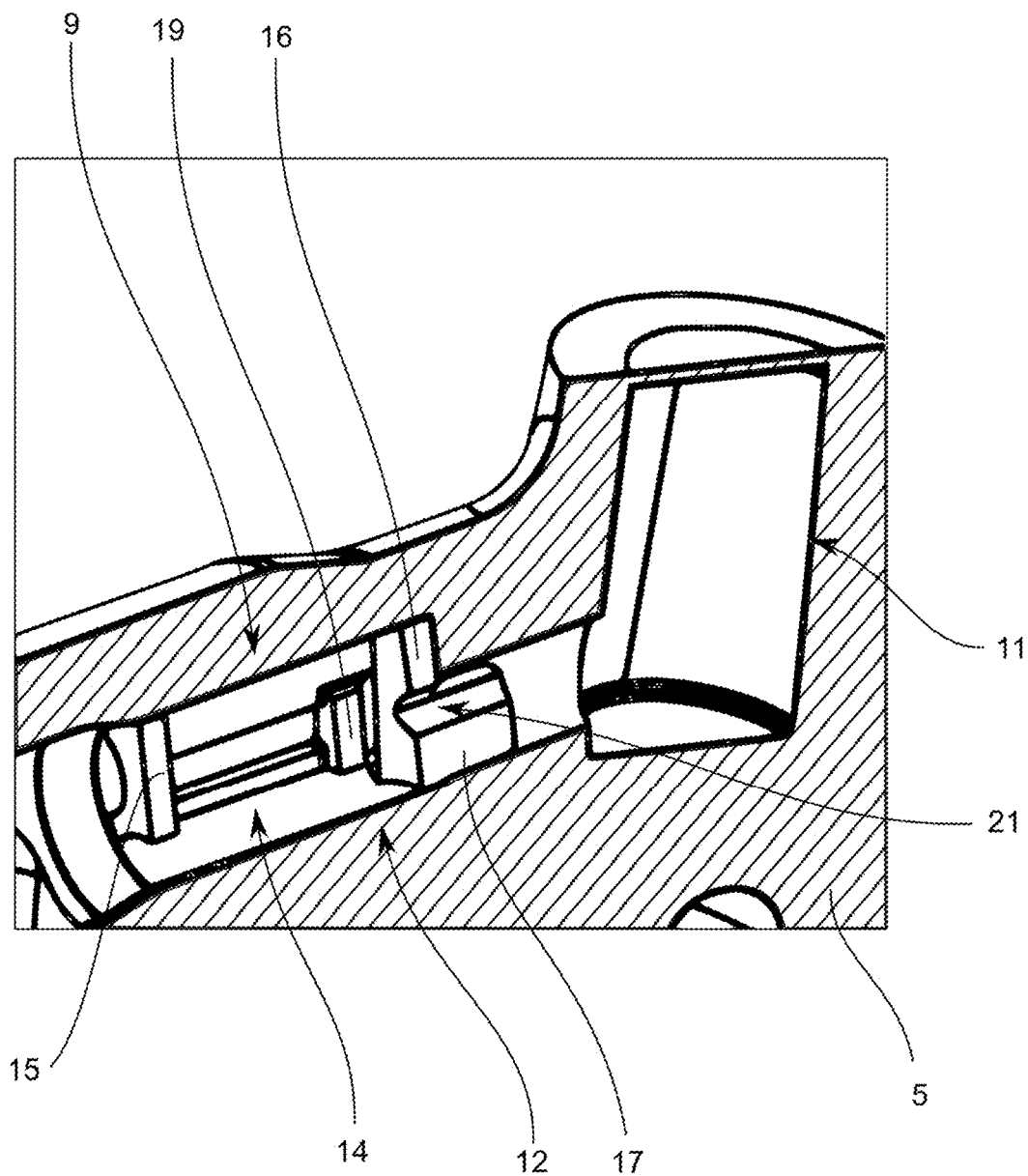
FIG. 2 shows a detailed view of a ventilation channel in a transmission housing in a perspective axial sectional view.

The separator cartridge 9 is explained in more detail below with reference to FIGS. 2-4. The separator cartridge 9 is made of a plastic, in particular by means of an injection molding process, and is fixed form-fittingly and/or frictionally in the ventilation channel 8.

Figure 3:
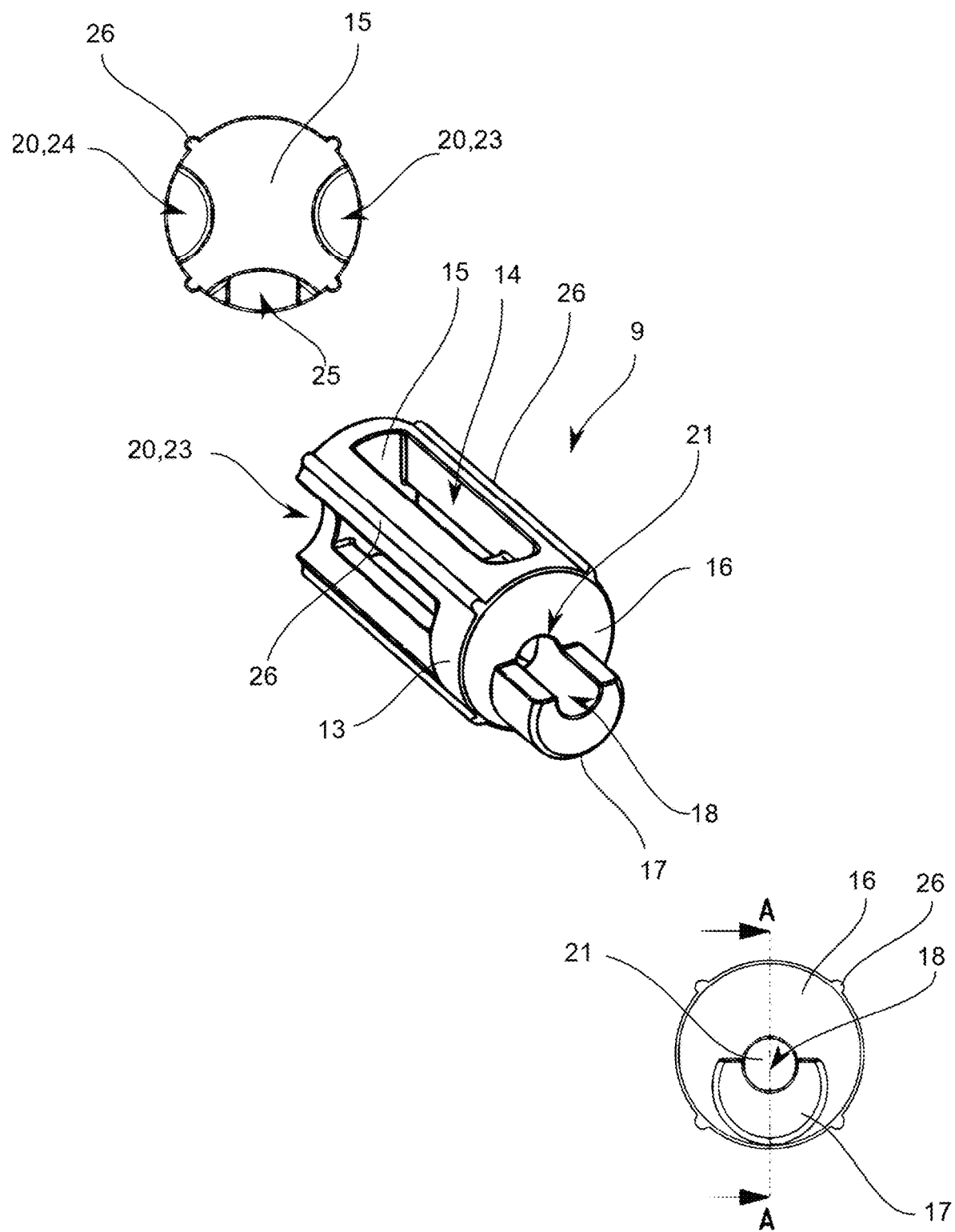
FIG. 3 shows a separator cartridge in a perspective view, a frontal view and a rear view.
Figure 4:
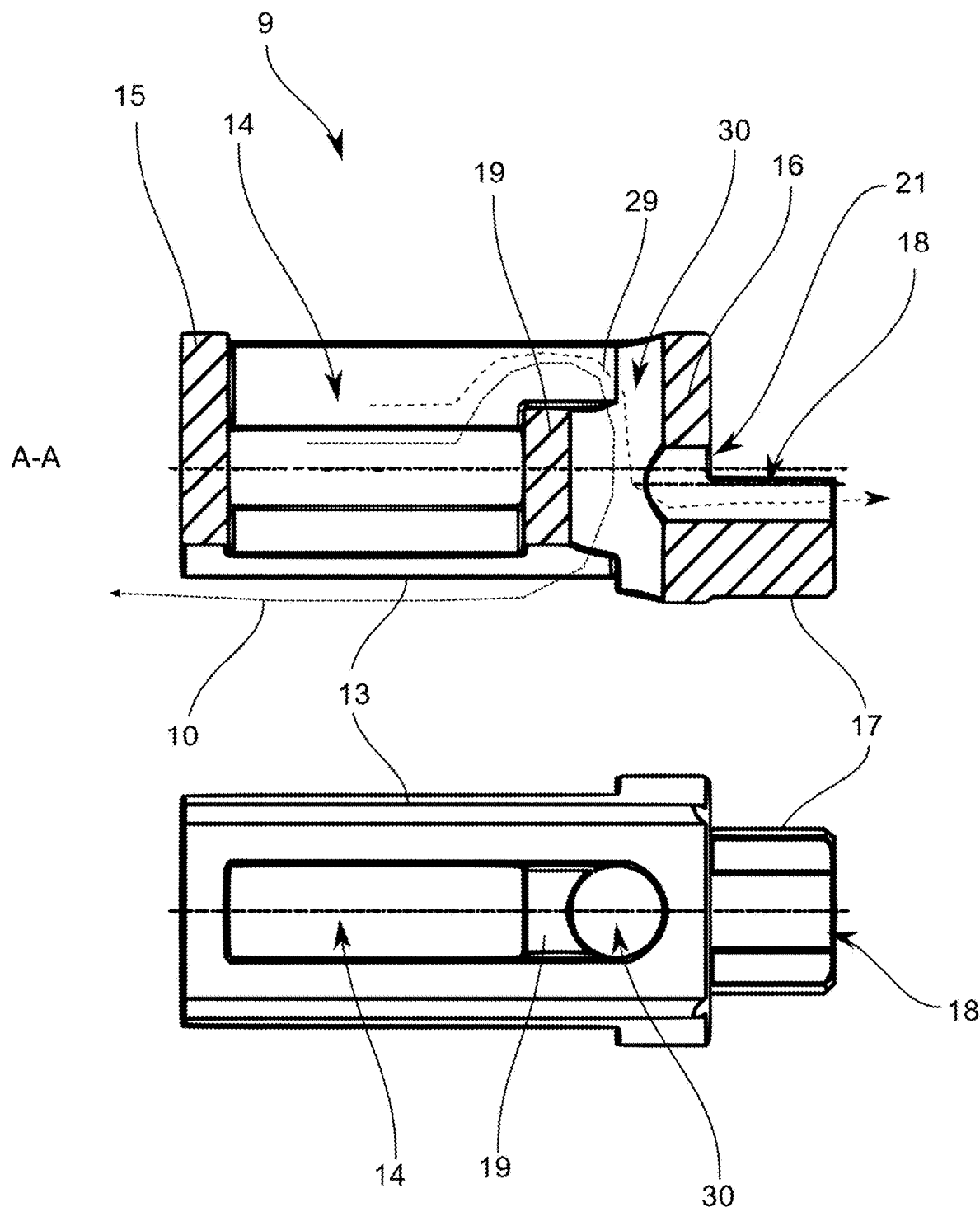
FIG. 4 shows a separator cartridge in an axial sectional view and a top view.

The separator cartridge 9 has a cylindrical main body 13, through the interior 14 of which hydraulic fluid 10 can flow through a first opening 20 of a first end face 15 and through a second opening 21 of a second end face 16, which can be clearly seen from FIGS. 3-4. The first opening 20 of the first end face 15 has at least two inlet openings 23, 24 which are arranged in the direction of gravity above a return opening 25 provided in the first end face 15. Radially projecting ribs 26 are formed on the outer lateral surface of the main body 13, by means of which the separator cartridge 9 is pressed in the ventilation channel 8.

A plug 17 is arranged on the second end face 16 and extends out of the main body 13 in the axial direction, wherein the plug 17 has an outlet channel 18 which is connected to the interior 14 of the main body 13 through the second opening 21 of the second end face 16. The plug 17 is arranged eccentrically with respect to the cylindrical main body 13.

It can be seen from FIG. 4 that a screen element 19 is arranged in the interior 14 axially offset in front of the second opening 21, so that an axial flow of the hydraulic fluid 10 to the second opening 21 from the interior 14 is prevented, which is indicated by the corresponding arrows.

Hydraulic fluid 10 and air 29 enter the interior 14 of the main body 13 of the separator cartridge 9 through the inlet openings 23, 24. Hydraulic fluid 10 and air 29 are then distributed in the interior 14 of the separator cartridge 9 during operation of the axle drive train 1. A portion of the hydraulic fluid 10 and the air 29 enters the head space 30 of the separator cartridge 9 via a type of 'labyrinth guide' which is defined by the screen element 19 located in the flow direction of the hydraulic fluid 10. The head space 30 is thus defined by the screen element 19, extending in each case in a radial plane, and the second end face 16.

The screen element 19, which is formed monolithically with the main body 13, prevents or minimizes the direct inflow of the hydraulic fluid 10 into the second opening 21 of the second end face 16. Owing to the resulting diversion of the fluid flow of hydraulic fluid 10 from an axial direction to a radial direction, the hydraulic fluid 10 is directed downwards so that a large part of it returns to the transmission assembly 6 via the return opening 25. Air 29, which is to be guided out of the transmission assembly 6, passes via the opening 21 and the outlet channel 18 into the second channel section 12 of the ventilation channel 8.

The disclosure is not limited to the embodiments shown in the figures. The above description is therefore not to be regarded as limiting, but rather as illustrative. The following claims are to be understood as meaning that a stated feature is present in at least one embodiment of the disclosure. This does not exclude the presence of further features. Where the claims and the above description define 'first' and 'second' features, this designation serves to distinguish between two features of the same type without defining an order of precedence.

LIST OF REFERENCE SIGNS

1 Axle drive train
 2 Motor vehicle
 3 Motor housing
 4 Electric machine
 5 Transmission housing
 6 Transmission assembly
 7 Unit
 8 Ventilation channel
 9 Separator cartridge
10 Hydraulic fluid
11 Channel section
12 Channel section
13 Main body
14 Interior
15 End face
16 End face
17 Plug
18 Outlet channel
19 Screen element
20 Opening
21 Opening
23 Inlet opening
24 Inlet opening
25 Return opening
26 Ribs
27 Freewheel device
28 Ring gear
29 Air
30 Head space

The invention claimed is:

1. An electrically operable axle drive train for a motor vehicle, comprising an electric machine accommodated in a motor housing, and a transmission assembly accommodated in a transmission housing, wherein the electric machine and the transmission assembly form a structural unit, and a ventilation channel extending through the transmission housing, opposite a direction of gravity, connects the transmission assembly within the transmission housing to the environment, wherein a separator cartridge having a first end face having a first opening and a second end face having a second opening and designed as a separate component from the transmission housing is introduced into the ventilation channel and is configured to reduce the flow rate of a hydraulic fluid in the ventilation channel, wherein a plug is arranged on the second end face, which extends in an axial direction from a main body, wherein the plug has an outlet channel which is connected by the second opening of the second end face to an interior of the main body.

2. The axle drive train according to claim 1, wherein the ventilation channel has a first channel section extending in the direction of gravity, from which a second channel section extends in a radial and axial direction through the transmission housing to the transmission assembly, and the separator cartridge is arranged in the second channel section.

3. The axle drive train according to claim 1, wherein the separator cartridge is made of a plastic.

4. The axle drive train according to claim 1, wherein the separator cartridge is at least one of form-fittingly or frictionally fixed in the ventilation channel.

5. The axle drive train according to claim 1, wherein the hydraulic fluid can flow through the first opening of the first end face and through the second opening of the second end face.

6. The axle drive train according to claim 5, wherein the plug is arranged eccentrically with respect to the cylindrical main body.

7. The axle drive train according to claim 5, wherein a screen element is arranged in the interior axially offset in front of the second opening so that an axial flow of the hydraulic fluid to the second opening from the interior is prevented.

8. The axle drive train according to claim 5, wherein the first opening of the first end face comprises at least two inlet openings which are arranged in the direction of gravity above a return opening provided in the first end face.

9. The axle drive train according to claim 1, wherein radially projecting ribs are formed on an outer lateral surface of the main body.

10. A transmission assembly for an electrically operable axle drive train for a motor vehicle, comprising a transmission housing accommodating the transmission assembly, and a ventilation channel extending through the transmission housing, opposite a direction of gravity, connecting the transmission assembly within the transmission housing to the environment, wherein a separator cartridge having a first end face having a first opening and a second end face having a second opening and designed as a separate component from the transmission housing is introduced into the ventilation channel and is configured to reduce the flow rate of a hydraulic fluid in the ventilation channel, wherein a plug is arranged on the second end face, which extends in an axial direction from a main body, wherein the plug has an outlet channel which is connected by the second opening of the second end face to an interior of the main body.

11. The transmission assembly according to claim 10, wherein the ventilation channel has a first channel section extending in the direction of gravity, from which a second channel section extends in a radial and axial direction through the transmission housing to the transmission assembly, and the separator cartridge is arranged in the second channel section.

12. The transmission assembly according to claim 10, wherein the separator cartridge is made of a plastic.

13. The transmission assembly according to claim 10, wherein the separator cartridge is at least one of form-fittingly or frictionally fixed in the ventilation channel.

14. The transmission assembly according to claim 10, wherein the hydraulic fluid can flow through the first opening of the first end face and through the second opening of the second end face.

15. The transmission assembly according to claim 14, wherein the plug is arranged eccentrically with respect to the cylindrical main body.

16. The transmission assembly according to claim 14, wherein a screen element is arranged in the interior axially offset in front of the second opening so that an axial flow of the hydraulic fluid to the second opening from the interior is prevented.

17. The transmission assembly according to claim 14, wherein the first opening of the first end face comprises at least two inlet openings which are arranged in the direction of gravity above a return opening provided in the first end face.

18. The transmission assembly according to claim 10, wherein radially projecting ribs are formed on an outer lateral surface of the main body.

* * * * *